United States Patent [19]
Baker

[11] 3,914,336
[45] Oct. 21, 1975

[54] TIN-VANADIUM POLYESTER ACCELERATOR SYSTEM

[75] Inventor: John G. Baker, Cheswick, Pa.

[73] Assignee: PPG Industries, Inc., Pittsburgh, Pa.

[22] Filed: Jan. 30, 1974

[21] Appl. No.: 438,057

Related U.S. Application Data

[63] Continuation of Ser. No. 33,482, April 30, 1970, abandoned.

[52] U.S. Cl. ............................................. 260/863
[51] Int. Cl.² ................. C08L 67/06; C08F 283/00
[58] Field of Search ............................ 260/863, 869

[56] References Cited
UNITED STATES PATENTS

| | | | |
|---|---|---|---|
| 2,467,527 | 4/1949 | Harris .................................. | 260/863 |
| 2,779,701 | 1/1957 | Robitschek et al. ................. | 428/431 |
| 3,079,363 | 2/1963 | Koch et al. ........................... | 260/863 |
| 3,196,191 | 7/1965 | Haigh et al. ......................... | 260/869 |
| 3,285,995 | 11/1966 | Nametz et al. ...................... | 260/865 |
| 3,519,700 | 7/1970 | Baum .................................... | 260/869 |
| 3,573,215 | 3/1971 | Nametz et al. ...................... | 252/192 |
| 3,585,254 | 6/1971 | Buck .................................... | 260/689 |

Primary Examiner—Melvin Goldstein
Attorney, Agent, or Firm—William J. Uhl

[57] ABSTRACT

This invention relates to an accelerator system for promoting the cure of halogen-containing unsaturated polyester resins which comprises an accelerator system containing a mixture of a soluble stannous salt and a vanadium salt.

12 Claims, No Drawings

TIN-VANADIUM POLYESTER ACCELERATOR SYSTEM

This is a continuation of application Ser. No. 33,482, filed Apr. 30, 1970, now abandoned.

STATE OF THE ART

Halogenated unsaturated polyester resins are well-known items of commerce and find utility in the area of fire retardant moldings and coatings. Polyester resins generally, their compositions, and applications have been discussed in such publications as POLYESTERS AND THEIR APPLICATIONS by Bjorksten, Reinhold Publishing Corporation (1956). Conventionally, liquid or fusible linear polyesters with polymerizable ethylenic sites are mixed with ethylenically unsaturated compounds, often referred to as "monomers" and the mixture copolymerized in the presence of a free radical initiating catalyst. The accelerators are frequently employed to speed up the gel time and the curing time.

It has been found, however, that halogenated polyester resins do not respond as readily to acceleration by most commonly used metal salt accelerators, as do unsaturated polyester systems generally. Frequently, it has been found that gel time may be advanced; however, the curing is retarded or fails to go to completion.

DESCRIPTION OF THE INVENTION

It has now been found that the combination of a phosphorus acid and a vanadium salt utilized in conjunction with halogenated unsaturated polyester resins provides relatively short gel times coupled with a complete cure.

The unsaturated polyester resins which may be utilized in the compositions of this invention include unsaturated polyester resins which are mixtures comprising: (1) a polyester formed from (A) a halogenated dicarboxylic acid or anhydride, preferably where the halogen is chlorine or bromine and preferably selected from tetrachloro or tetrabromophthalic acids or anhydrides or the Diels Alder adducts of hexachlorocyclopentadiene and maleic or phthalic anhydrides, i.e., 1,4,5,6,7,7-hexachlorobicyclo(2.2.1)-5-heptene-2,3-dicarboxylic acid or anhydride and 7,8,9,10,11,11-hexachlorotricyclo-[4,4,0,17,10]-2,4,8-undecatriene-3,4-dicarboxylic acid or anhydride; (B) an alpha,beta-ethylenically unsaturated polycarboxylic acid and (C) a polyhydric alcohol; said polyester being admixed with (2) a monomer containing a copolymerizable vinyl group.

The ethylenically unsaturated polycarboxylic acid (B), which is preferably a dicarboxylic acid, utilized to form the polyesters described herein includes such acids as maleic acid, fumaric acid, aconitic acid, mesaconic acid, citraconic acid, and itaconic acid, the halo and alkyl derivatives of such acids and the like, the preferred acid being maleic acid. The anhydrides of these acids, where the anhydrides exist, are, of course, embraced under the term "acid" since the polyesters obtained therefrom are essentially the same whether the acid or the anhydride is utilized in the reaction. The ethylenically unsaturated dicarboxylic acids are conventionally employed in an amount of about 70 percent to about 30 percent of the total moles of acid component in the polyester, and preferably in an amount of about 60 percent to about 40 percent of the total moles of the acid component in the polyester.

If desired, a minor amount of the halogenated acid may be replaced by a saturated dicarboxylic acid. The acids modify the properties of the cured polyester and allow flexibility in end use. Examples of such acids which may be saturated or only aromatically unsaturated include: succinic acid, adipic acid, suberic acid, azelaic acid and the like. The anhydrides, where they exist, are embraced by the term "acid". Such saturated carboxylic acids may also be referred to as "non-olefinically unsaturated polycarboxylic acids".

Polyhydric alcohols useful in preparing the unsaturated polyester resins include ethylene glycol, diethylene glycol, polyethylene glycols, propylene glycol, dipropylene glycol, polypropylene glycols, glycerol, neopentyl glycol, pentaerythritol, trimethylol propane, trimethylol ethane and the like. The preferred polyols for the purposes of this invention have a molecular weight less than about 2000 and consist essentially of carbon and hydrogen and oxygen. The polyhydric alcohols are generally employed in equimolar ratio to the total acid components or in a slight excess, for example, about 5 mole percent excess or more if a low acid number polyester is desired.

Vinyl monomers which crosslink with unsaturated polyesters to form thermosetting materials, include such monomers as: styrene, vinyl toluene, alpha-methyl styrene, divinyl benzene, vinyl acetate, allyl acetate, diallyl phthalate, diallyl succinate, diallyl adipate, diallyl sebacate, methyl acrylate, methyl methacrylate, hexyl acrylate, octyl acrylate, octyl methacrylate, diallyl itaconate, diallyl maleate, diallyl fumarate, triallyl cyanurate, and the like. The preferred monomers are liquid compounds, soluble in the polyester components. Such monomers should preferably be free of nonaromatic carbon-carbon conjugated double bonds.

The monomer component or components may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer. At the preferred range, the monomer is present in an amount of about 20 percent to about 50 percent.

As set forth above, the novel accelerator system of this invention comprises a mixture of a soluble stannous salt and a soluble vanadium salt. The preferred vanadium salts are salts prepared from organic carboxylic acids, especially acids containing less than 25 carbon atoms and particularly monocarboxylic acids inasmuch as salts ordinarily have greater solubility in unsaturated polyester resins; however, the inorganic salts of vanadium may be utilized where the inorganic salts have sufficient solubility in unsaturated polyesters to be effectively dissolved and dispersed therein.

In the practice of this invention, the following salts exemplify useful salts: vanadium acetate, vanadium butyrate, vanadium benzoate, vanadium capronate, vanadium laurate, vanadium palmitate, vanadium octoate, vanadium propionate, vanadium naphthenate, vanadium neodecanoate and vanadium stearate. Although the above salts are derived from monocarboxylic acids, useful salts may be formed from the above cations and anions derived from polycarboxylic acids, especially dicarboxylic acids, including the following acids: adipic acid, citraconic acid, fumaric acid, maleic acid, oxalic acid, succinic acid, and the like.

The preferred stannous salts are salts prepared from organic carboxylic acids, especially acids containing less than 25 carbon atoms and particularly monocarboxylic acids inasmuch as salts ordinarily have greater monocarboxylic acids inasmuch as salts ordinarily have greater solubility in unsaturated polyester resins; however, the inorganic stannous salts may be utilized where the inorganic salts have sufficient solubility in unsaturated polyester to be effectively dissolved and dispersed therein.

In the practice of this invention, the following salts exemplify useful salts: stannous acetate, stannous butyrate, stannous benzoate, stannous capronate, stannous laurate, stannous palmitate, stannous octoate, stannous propionate, stannous naphthenate and stannous stearate. Although the above salts are derived from mono-carboxylic acids, useful salts may be formed from the above cations and anions derived from polycarboxylic acids, especially dicarboxylic acids, including the following acids: adipic acid, citraconic acid, fumaric acid, maleic acid, oxalic acid, succinic acid, and the like.

The anion portions of the salt have minimal, if any, effect on the accelerated characteristics; however, the anion portion of the salt does contribute solubility to the metal, thus the anion portions of these salts are preferably any radical—organic or inorganic—which promotes the solubility of metal in the unsaturated polyester resin.

The proportions of the accelerator mixture are not unduly critical. As is typically the case with accelerators, relatively small amounts are effectively employed. The amount employed may be any amount which demonstrates the accelerating effect described herein. Generally the soluble stannous salt is employed in an amount of about 0.05 percent to about 0.5 percent tin metal based on the weight of the unsaturated polyester mixture. Generally, the soluble vanadium salt is employed in an amount of about 0.0001 percent to about 0.1 percent of vanadium metal based on the weight of the unsaturated polyester mixture.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature is usually in the range of about 100°C. to about 120°C., which is sufficiently high in the absence of gelation inhibitors, to induce premature gelation upon introduction of the monomer into the system. This is true even in the absence of free radical catalysts.

Accordingly, it is preferred to include a gelation inhibitor in one or both components of the mixture. Suitable inhibitors may be selected from the quinonic or phenolic class or from a group of quaternary ammonium salts and amine salts. Suitable inhibitors of the quinonic or phenolic class include: p-benzoquinone, chloranil, hydroquinone, 3-isopropyl catechol, 4-t-butyl catechol, 3-methyl catechol, 4-ethyl catechol, 4-isopropyl catechol, and the like.

The following are representative examples of halide salts of amines which may be employed as inhibitors: trimethylamine hydrochloride, trimethylamine hydrobromide, dimethylaniline hydrochloride, triethylamine hydrochloride, tri-n-butylamine hydrochloride, tribenzylamine hydrobromide, N-benzylaniline hydrochloride, and the like. Useful quaternary ammonium salts include: trimethylbenzyl ammonium acid oxalate, trimethyl benzyl ammonium chloride, di(trimethyl benzyl ammonium)oxalate, trimethylbenzyl ammonium maleate, trimethyl benzyl ammonium tartrate, and the like. Other useful ammonium compounds and amine halide compounds are disclosed in U.S. Pat. Nos. 2,593,787 and 2,646,416, respectively.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but conventionally is in a range of about 0.001 percent to about 0.1 percent by weight, based upon the polyester mixture. Interpolymerizable mixtures of polyesters of alpha,beta-ethylenically unsaturated dicarboxylic acids and monomers containing an inhibitor, as above described, may be stored over substantial periods of time, for example, several weeks or even months, without premature gelation.

The accelerator mixture is added to an inhibited unsaturated polyester resin either before or at the time the polymerization catalyst is added in order to cure the resin. When the interpolymerizable mixture is to be employed in the preparation of castings or laminates, or other products in accordance with the provisions of the present invention, there is employed a free radical catalyst, which is an organic peroxide, organic hydroperoxide or esters thereof, and which is activated by the accelerators hereinabove described. Typical organic peroxides useful as catalysts for unsaturated polyester resins include: benzoyl peroxide, acetyl peroxide, lauroyl peroxide, methyl ethyl ketone peroxide, cyclohexanone peroxide, and the like.

Organic hydroperoxides or their esters with carboxylic acids useful as catalysts for unsaturated polyester resins include: cumene hydroperoxide, tertiary butyl hydroperoxide, ditertiary butyl perphthalate, 1-hydroxycyclohexyl hydroperoxide, and the like.

Many other useful catalysts are disclosed in the monograph ORGANIC PEROXIDES by A. V. Tobolsky and R. B. Mesrobian, copyrighted in 1954 by Interscience Publishers, Inc., New York, pages 158–163. These catalysts may be utilized in amounts of about 0.1 percent to about 5 percent by weight, based upon the mixture of interpolymerizable materials. Naturally, the amount of the organic peroxide catalyst applicable in the practice of the invention will vary with the activity of the particular accelerator and with the amount of inhibitor present in the interpolymerizable mixture. All of the organic free radical compounds constitute catalysts of interpolymerization at elevated temperatures and are desirable in order to obtain a complete and thorough cure in the mixtures within reasonable periods of time and at reasonable temperatures. Such catalysts effectively cure unsaturated polyester resins at low temperatures when an appropriate accelerator is present, such as the novel accelerator system of this invention.

The following example sets forth specific embodiments of the instant invention; however, the invention is not to be construed as being limited to these embodiments, for there are, of course, numerous possible variations and modifications.

EXAMPLE

The polyester employed in this example had the following composition:

| Reactor Charge: | Moles |
| --- | --- |
| Tetrachlorophthalic anhydride | 6.0 |
| Maleic anhydride | 4.0 |
| Ethylene glycol | 10.5 | cooked to a 30 acid number and a Gardner-Holdt viscosity of H-I (60 percent solids in the monethyl ether of ethylene glycol).

The thinned resin composition was as follows:

| | Parts by Weight |
| --- | --- |
| Polyester alkyd (above) | 65.0 |
| Styrene | 35.0 |
| Metal hydroquinone | 0.01 |
| Silica (Cab-O-Sil) | 0.8 |
| Tris(2-chloroethyl)phosphate | 11.3 |

This composition is hereinafter referred to as the unsaturated polyester.

The accelerator solution employed below consisted of two parts of vanadium naphthenate (3 percent vanadium) in 18 parts of styrene.

Each of the compositions below were catalyzed with one percent methyl ethyl ketone peroxide. Gel times were measured at 77°F.

| Unsaturated Polyester (Parts) | Accelerator Solution (Percent) | Stannous Octoate (Percent) | Gel Time (Min.) | Cure |
| --- | --- | --- | --- | --- |
| 100 | 1 | — | 55.8 | Very slow |
| 100 | 1 | 0.5 | 28.5 | Fast cure |

Higher or lower amounts of the vanadium compound or stannous octoate may be employed as described hereinabove to achieve the results within the scope of this invention. Also other vanadium salts as well as soluble stannous salts may be substituted for those above and similar accelerator effects are obtained.

Although the invention is specifically shown hereinabove, it is not intended that the invention be limited solely thereto, but to include all the variations and modifications within the scope of the appended claims.

I claim:

1. A composition comprising:
   A. a liquid copolymerizable, ethylenically-unsaturated monomer;
   B. an unsaturated polyester of:
      1. a chlorinated or brominated dicarboxylic acid or anhydride,
      2. an alpha, beta-ethylenically unsaturated dicarboxylic acid or anhydride, and
      3. a polyhydric alcohol; and
   C. an effective amount of an accelerator mixture of:
      1. a soluble stannous salt, and
      2. a soluble vanadium salt.

2. A composition as in claim 1 comprising:
   A. a liquid copolymerizable, ethylenically-unsaturated monomer;
   B. an unsaturated polyester of:
      1. a chlorinated dicarboxylic acid or anhydride,
      2. an alpha, beta-ethylenically unsaturated dicarboxylic acid or anhydride,
      (1) being from about 30 percent to about 90 percent by weight of components (1) and (2); and
      3. a dihydric alcohol; and
   C. an accelerator mixture of:
      1. a soluble stannous salt, being present in an amount of from about 0.05 percent to about 0.5 percent by weight of components (A) and (B), and
      2. a soluble vanadium salt, being present in an amount of from about 0.0001 percent to about 0.1 percent by weight of components (A) and (B).

3. A composition as in claim 2 wherein the component (A) comprises styrene.

4. A composition as in claim 3 wherein (C) (1) is stannous carboxylate and (C) (2) comprises an organic carboxylic acid salt containing less than 25 carbon atoms.

5. A composition as in claim 1 comprising:
   A. a liquid copolymerizable, ethylenically unsaturated monomer;
   B. an unsaturated polyester of:
      1. a chlorinated dicarboxylic acid or anhydride selected from the group consisting of tetrachlorophthalic acid, tetrabromophthalic acid, 1,4,5,6-,7,7-hexachlorobicyclo(2.2.1)-5-heptene-2,3-dicarboxylic acid and their anhydrides,
      2. an alpha, beta-ethylenically unsaturated dicarboxylic acid or anhydride, and
      3. a polyhydric alcohol; and
   C. an accelerator mixture of:
      1. a soluble stannous salt, and
      2. a soluble vanadium salt.

6. A composition as in claim 1 comprising:
   A. a liquid copolymerizable, ethylenically-unsaturated monomer;
   B. an unsaturated polyester of:
      1. a chlorinated dicarboxylic acid or anhydride selected from the group consisting of tetrachlorophthalic acid, tetrabromophthalic acid, 1,4,5,6-,7,7-hexachlorobicyclo(2.2.1)-5-heptene-2,3-dicarboxylic acid and their anhydrides,
      2. an alpha, beta-ethylenically unsaturated dicarboxylic acid or anhydride, and
      3. a polyhydric alcohol; and
   C. an accelerator mixture of:
      1. a soluble stannous salt, being present in an amount of from about 0.05 percent to about 0.5 percent by weight tin metal of components (A) and (B), and
      2. a soluble vanadium salt, being present in an amout of from about 0.0001 percent to about 0.1 percent by weight vanadium metal of components (A) and (B).

7. A composition as in claim 6 wherein the component (A) comprises styrene.

8. A composition as in claim 7 wherein (C) (1) is stannous octoate and (C) (2) comprises an organic carboxylic acid salt containing less than 25 carbon atoms.

9. A composition as in claim 1 comprising:
   A. a liquid copolymerizable, ethylenically-unsaturated monomer;
   B. an unsaturated polyester of:
      1. tetrachlorophthalic acid or anhydride, 2. an alpha, beta-ethylenically unsaturated dicarboxylic acid or anhydride, and
3. a polyhydric alcohol; and
C. an accelerator mixture of:
1. stannous carboxylate, and
2. a soluble vanadium salt.

10. A composition as in claim 1 comprising:
A. a liquid copolymerizable, ethylenically-unsaturated monomer,
B. an unsaturated polyester of:
1. tetrachlorophthalic acid or anhydride,
2. an alpha, beta-ethylenically unsaturated dicarboxylic acid or anhydride,
(1) being from about 30 percent to about 90 percent by weight of components (1) and (2); and
3. a dihydric alcohol; and
C. an accelerator mixture of:
1. stannous carboxylate, being present in an amount of from about 0.05 percent to about 0.5 percent by weight tin metal of components (A) and (B), and
2. a soluble vanadium salt, being present in an amount of from about 0.0001 percent to about 0.1 percent by weight vanadium metal of components (A) and (B).

11. A composition as in claim 10 wherein the component (A) comprises styrene.

12. A composition as in claim 11 wherein (C) (1) is stannous carboxylate and (C) (2) comprises an organic carboxylic acid salt containing less than 25 carbon atoms.

* * * * *